Dec. 11, 1928.
C. M. MacCHESNEY ET AL
1,694,512
ELECTRIC WELDING MACHINE
Filed Sept. 21, 1923 10 Sheets-Sheet 1
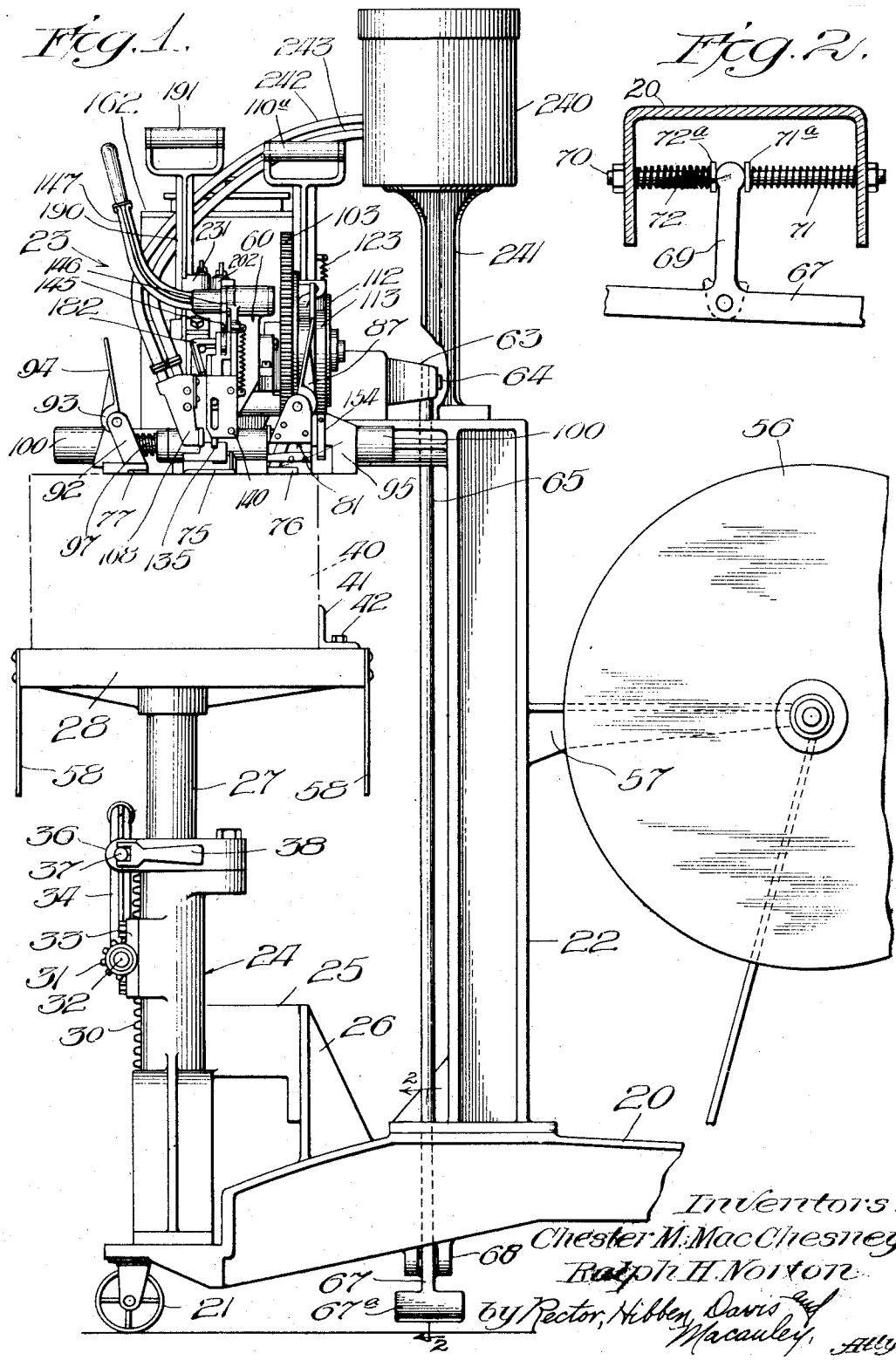
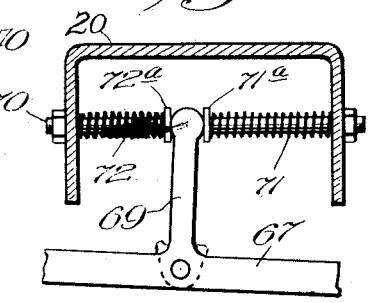
Inventors:
Chester M. MacChesney
Ralph H. Norton
by Rector, Hibben, Davis and Macauley, Attys Dec. 11, 1928.
C. M. MacCHESNEY ET AL
1,694,512
ELECTRIC WELDING MACHINE
Filed Sept. 21, 1923      10 Sheets-Sheet 2
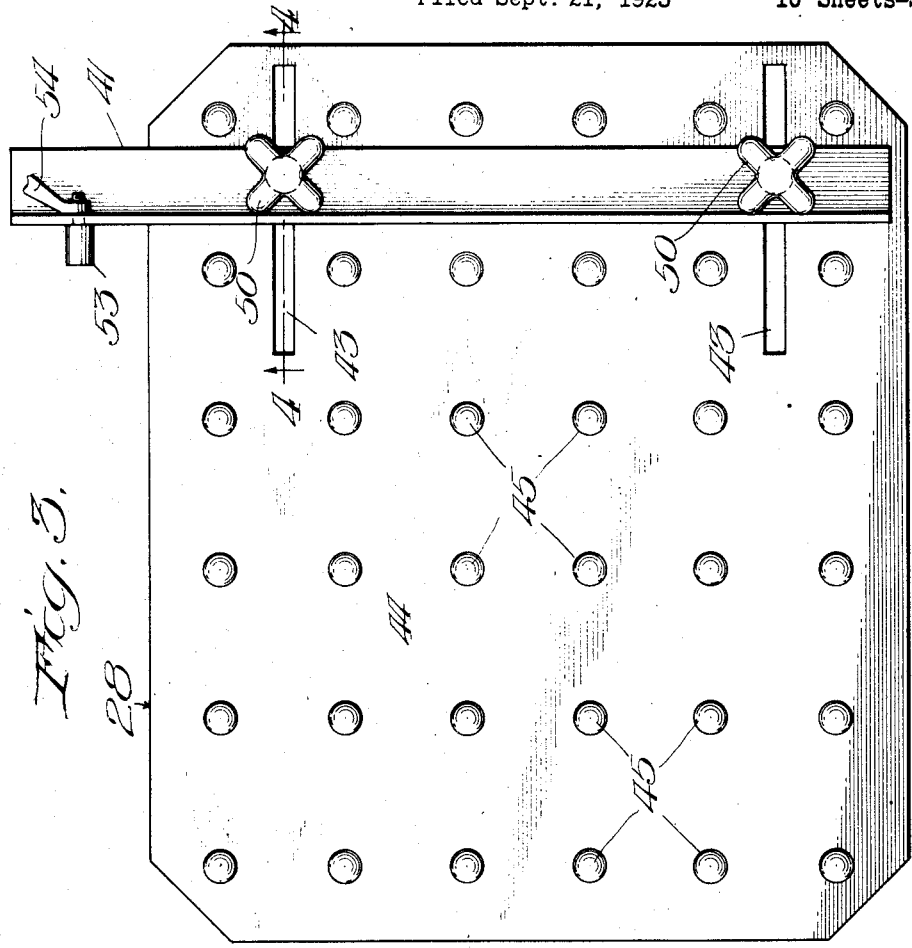
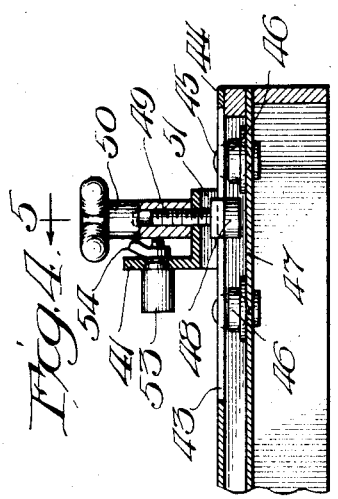
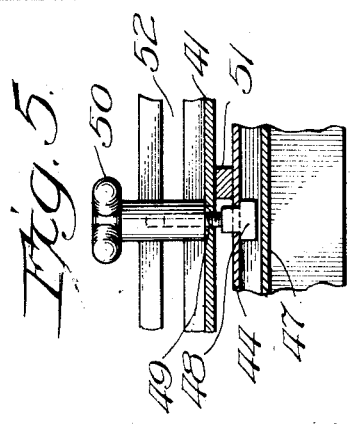
Inventors:
Chester M. MacChesney
Ralph H. Norton
by Rector, Hibben, Davis & Macauley,
Attys

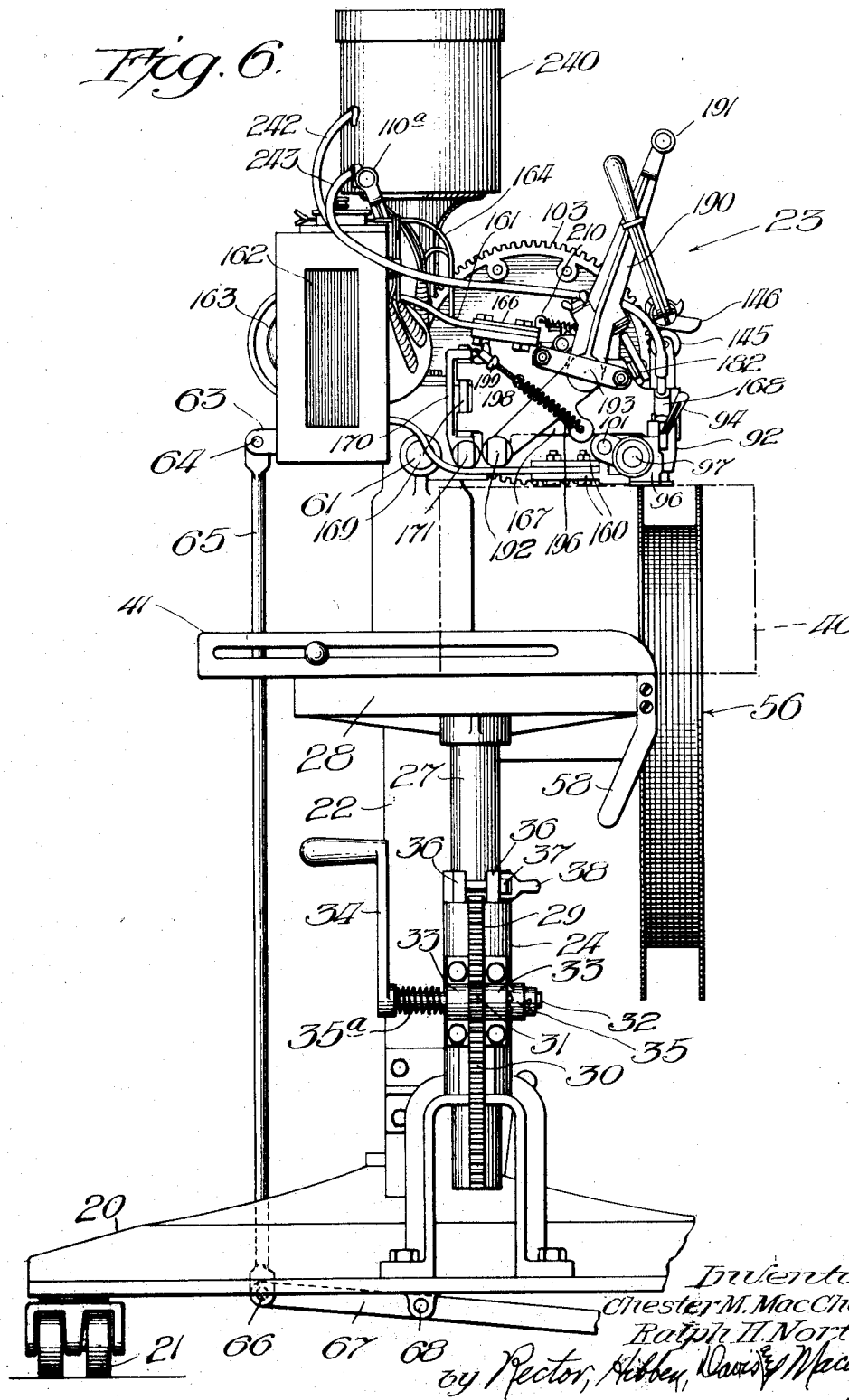

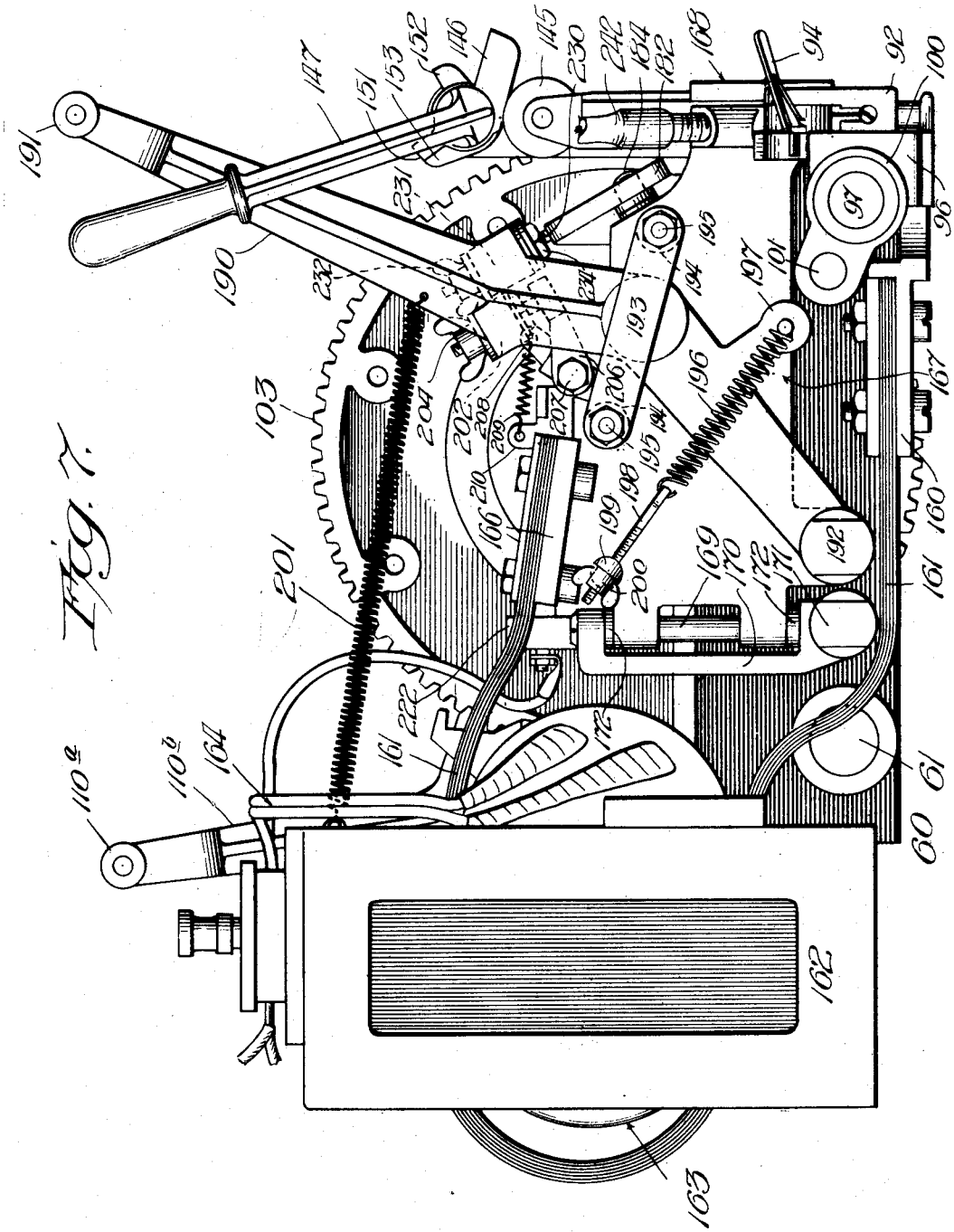

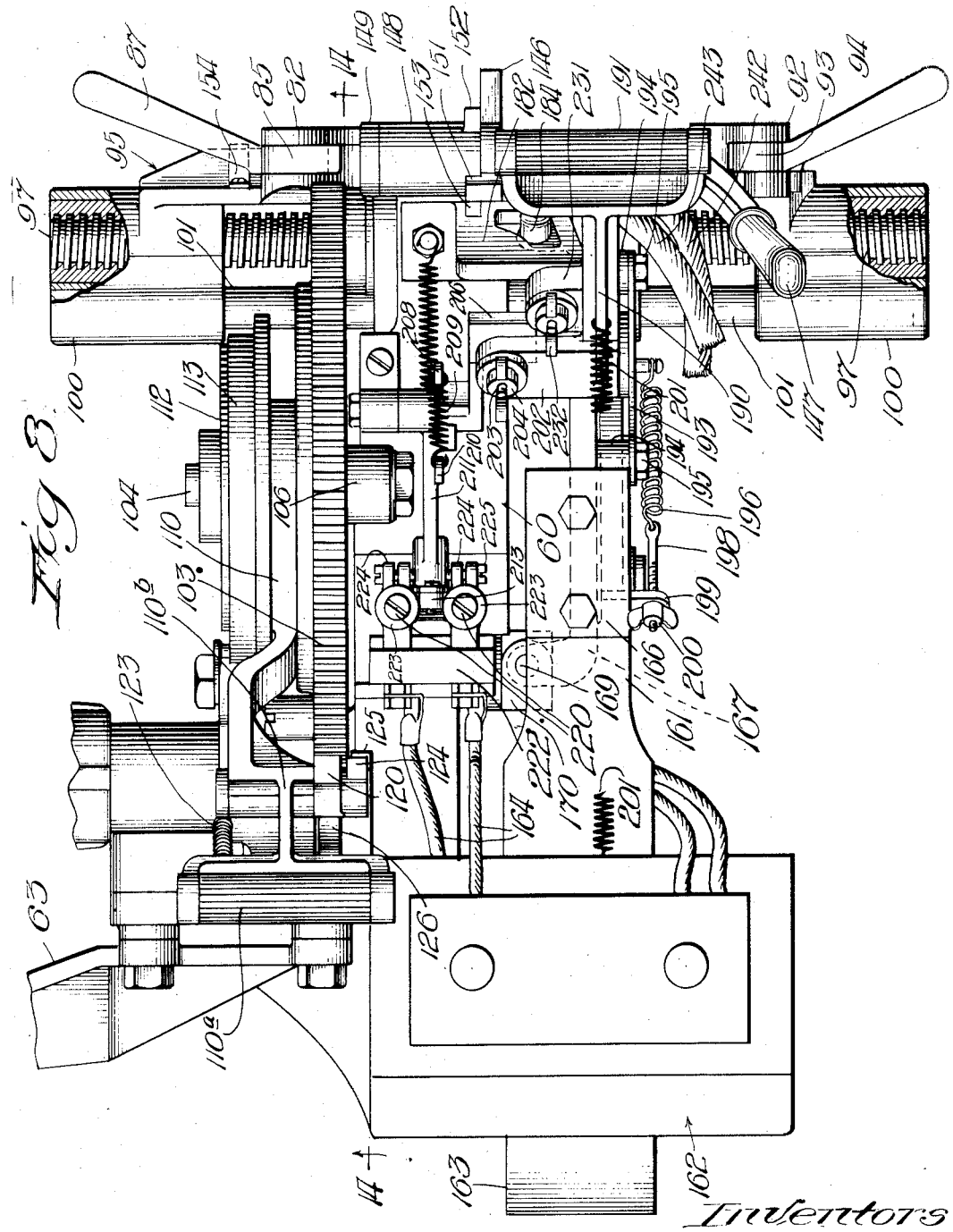

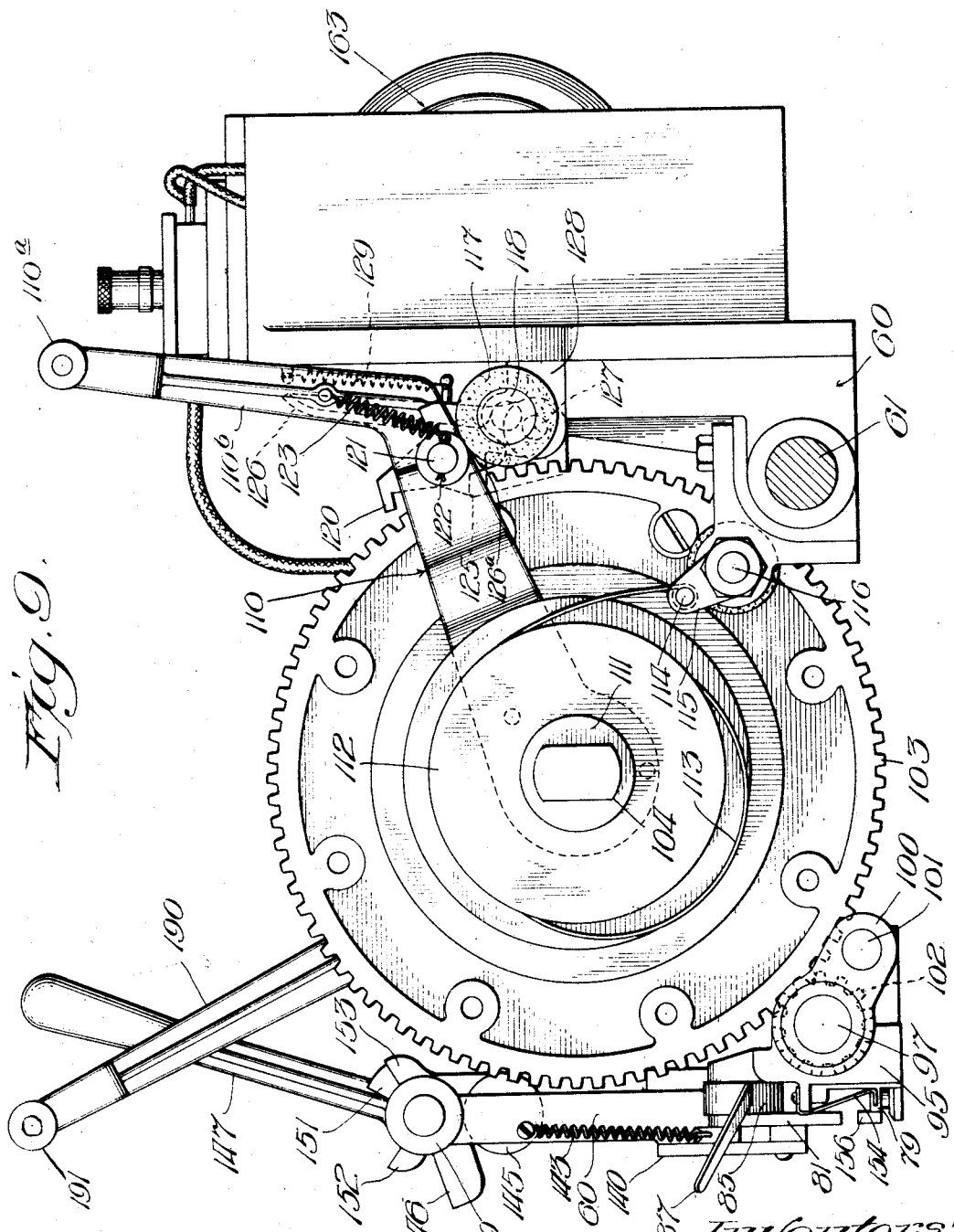

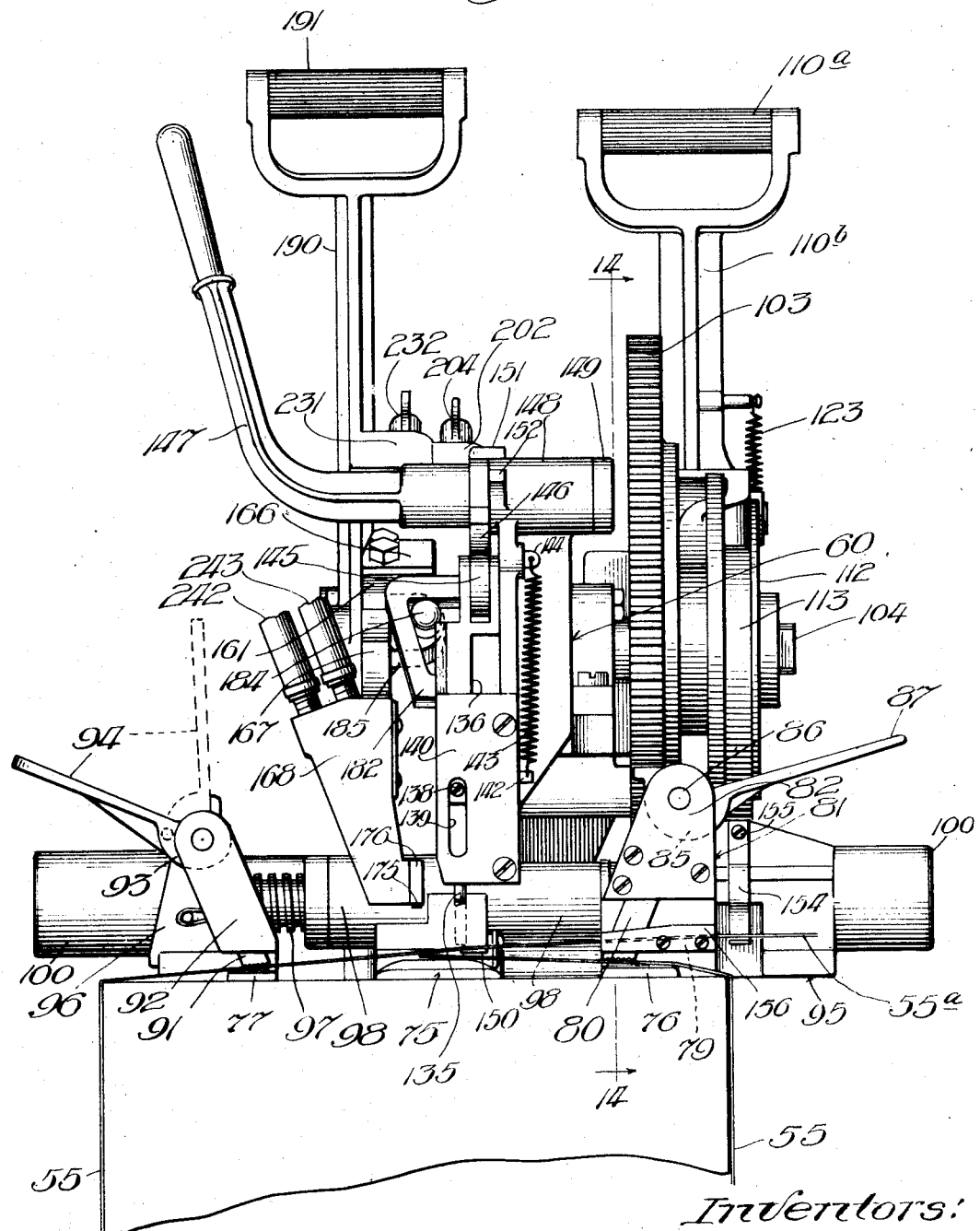

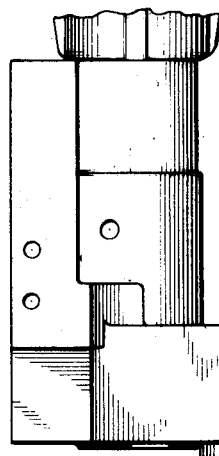
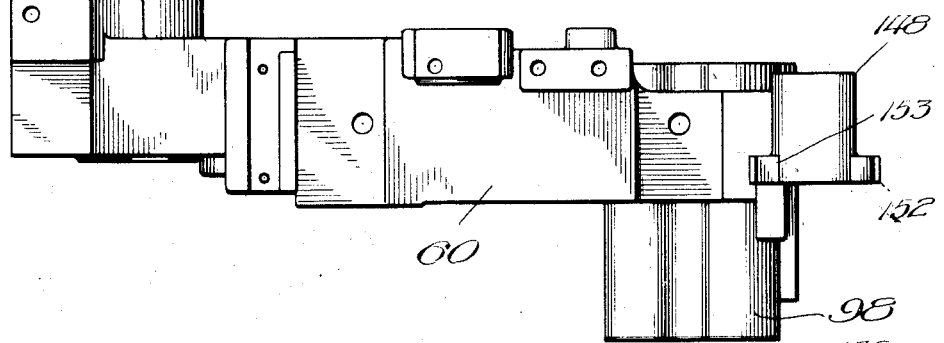
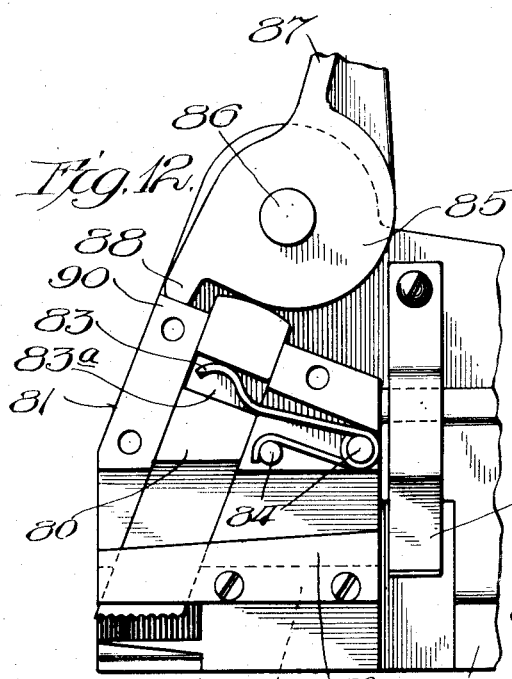
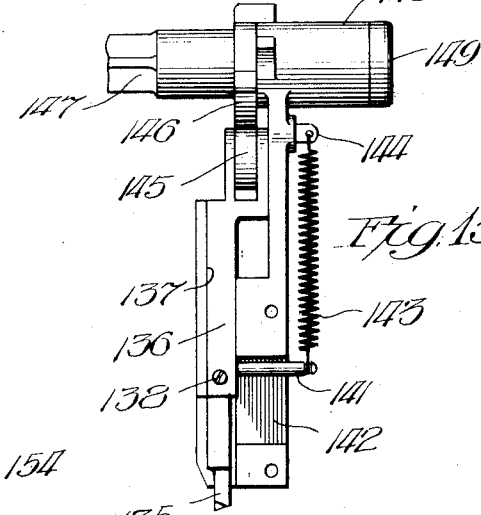

Dec. 11, 1928.                                                                1,694,512
C. M. MacCHESNEY ET AL
ELECTRIC WELDING MACHINE
Filed Sept. 21, 1923          10 Sheets-Sheet 9
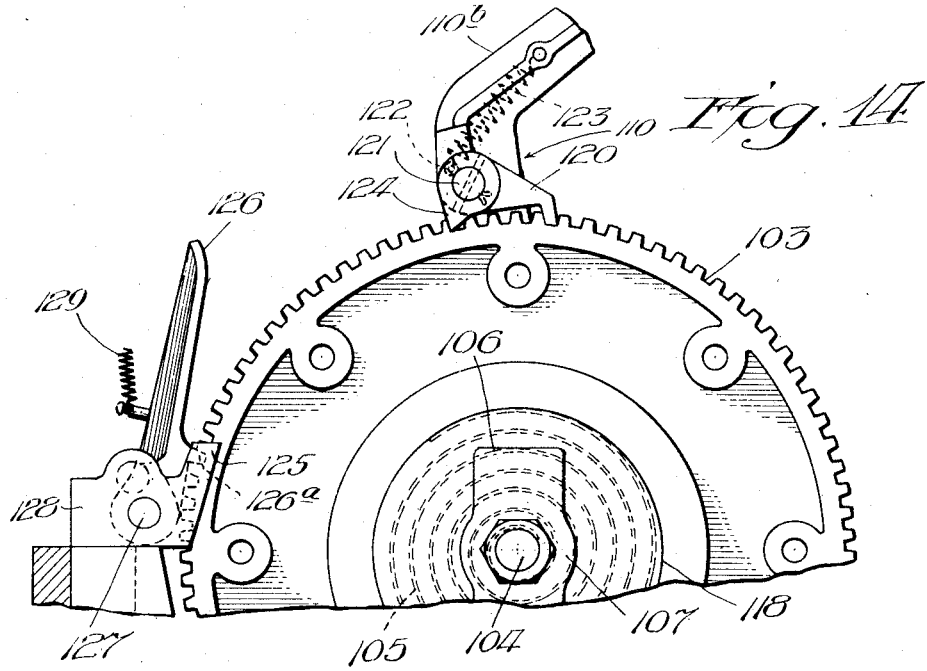
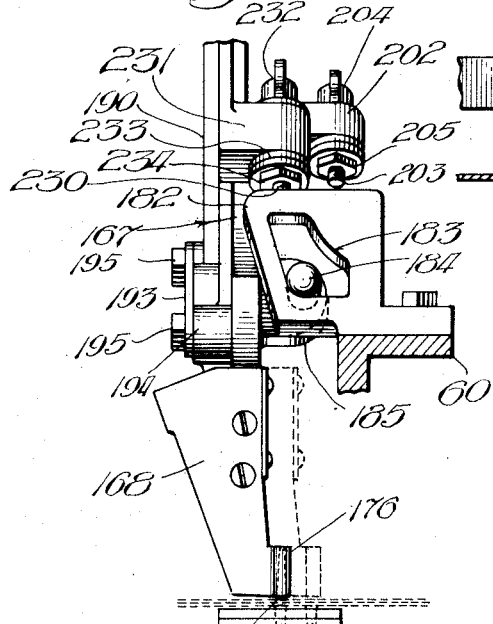
Inventors
Chester M. MacChesney
Ralph H. Norton
by Rector, Hibben, Davis & Macauley,
Attys Dec. 11, 1928. 1,694,512
C. M. MacCHESNEY ET AL
ELECTRIC WELDING MACHINE
Filed Sept. 21, 1923      10 Sheets-Sheet 10
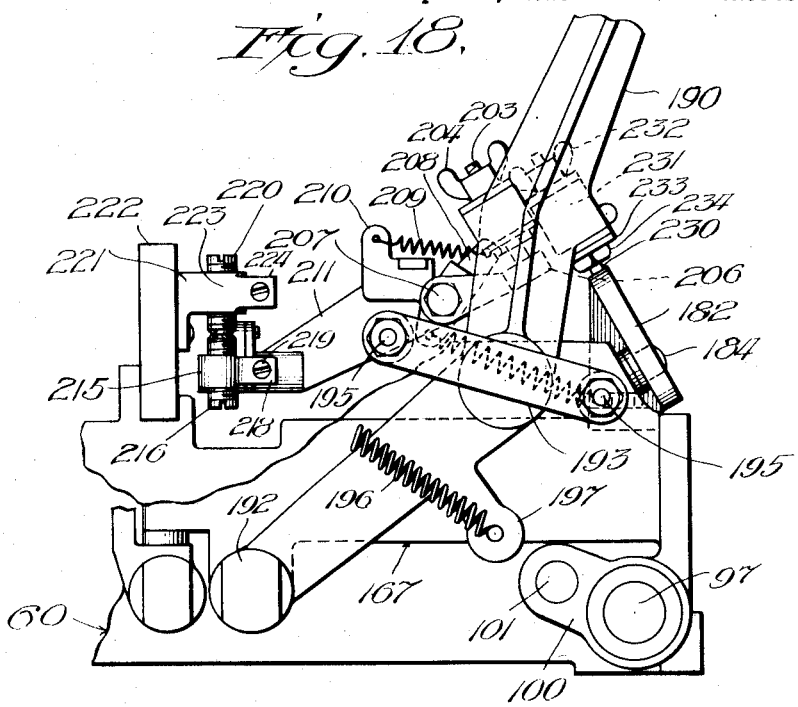
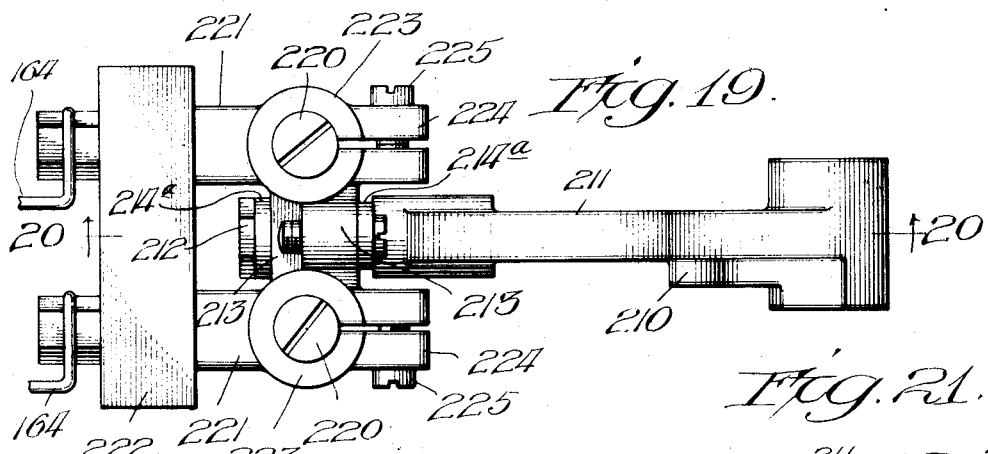
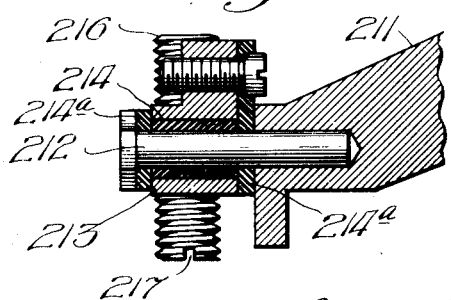
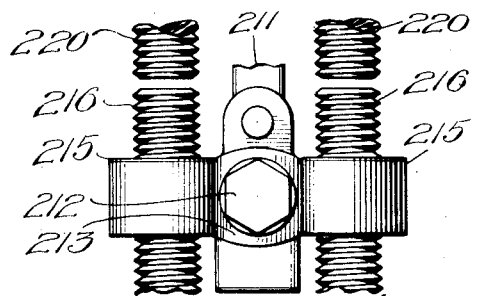
Inventors:
Chester M. MacChesney
Ralph H. Norton
by Rector, Hibben, Davis & Macauley, Attys Patented Dec. 11, 1928.

1,694,512

UNITED STATES PATENT OFFICE.

CHESTER M. MacCHESNEY AND RALPH H. NORTON, OF CHICAGO, ILLINOIS, ASSIGNORS TO ACME STEEL COMPANY, OF CHICAGO, ILLINOIS, A CORPORATION OF ILLINOIS.

ELECTRIC WELDING MACHINE.

Application filed September 21, 1923. Serial No. 664,089.

This invention relates to improvements in electric welding machines adapted for use in welding the ends of two straps or wires or for welding the overlapping ends of a strap or wire which has been bent into looped form. The invention may be employed with particular advantage in applying and welding reinforcing straps or bands on boxes or packages. The means for applying the reinforcing strap to the package is claimed in my co-pending divisional application Serial No. 48,980, filed August 8, 1925.

One object of the invention is to provide improved means for positioning the reinforcing strap on the box or package and severing the strap from the supply before welding it. A further object is to provide improved means for welding together the overlapping parts of the strap in proximity to the ends thereof. Another distinguishing feature of the invention is the provision of adjustable welding points adapted to engage the overlapping parts of the strap in a plurality of positions. Still another object is to provide improved mechanism for stretching the strap on the box before the welding operation takes place. Improved means have also been provided for insuring the passage of a current through the welding points after these points have been brought into contact with the overlapping portions of the strap. Other objects relate to various features of construction and arrangement which will appear more fully hereinafter.

The nature of the invention will be understood from the following specification, taken with the accompanying drawings, in which one embodiment is illustrated.

In the drawings, Fig. 1 shows a front elevation of the machine with parts thereof broken away; Fig. 2 shows a detail section taken on the line 2—2 of Fig. 1; Fig. 3 shows a top plan view of the box-supporting table, illustrating the means for positioning boxes thereon; Fig. 4 is a detailed sectional view taken on the line 4—4 of Fig. 3, looking in the direction of the arrows; Fig. 5 is a detailed sectional view taken on the line 5—5 of Fig. 4, looking in the direction of the arrows; Fig. 6 shows a side elevation of the machine, looking toward the right as viewed in Fig. 1; Fig. 7 shows an enlarged side elevation of the upper portion of the machine, illustrating the mechanism for operating the welding points and other parts of the welding apparatus; Fig. 8 shows a top plan view of the mechanism illustrated in Fig. 7; Fig. 9 shows a side elevation of the mechanism illustrated in Figs. 7 and 8, looking forward toward the rear side of the machine as viewed in Fig. 8; Fig. 10 shows a front elevation of the mechanism illustrated in Fig. 7; Fig. 11 shows a top plan view of the movable head upon which the welding apparatus is mounted; Fig. 12 shows an enlarged front elevation of one of the strap-gripping devices illustrated in Fig. 10, with the front cover-plate thereof removed; Fig. 13 shows a front elevation of the strap-cutting device illustrated in Fig. 10, with parts thereof removed; Fig. 14 shows a partial vertical section taken on the line 14—14 of Fig. 8, looking in the direction of the arrows; Fig. 15 shows a detailed front elevation of the welding points and associated parts, illustrating the construction of the points and their relation to the overlapping ends of the re-enforcing strap; Fig. 16 shows a top plan view of the meeting ends of the strap after they have been welded together at two points; Fig. 17 shows a longitudinal central section taken through the strap illustrated in Fig. 16; Fig. 18 shows a partial side elevation of the welding head with parts thereof broken away, illustrating the switch mechansim for establishing a circuit through the welding points after they have been brought into engagement with the overlapping ends of the strap; Fig. 19 shows a top plan view of the switch arm and the contact members embodied in the switch; Fig. 20 shows a detailed section taken on the line 20—20 of Fig. 1\$; and Fig. 21 shows an enlarged end elevation of the switch lever, illustrating the relative positions of the double-point contacts of the switch.

The machine comprises a supporting base 20 which is preferably mounted on rollers 21 so that the apparatus may be readily moved about. A vertical standard 22 extends upwardly from the base 20 and is adapted to carry the strap-stretching and welding mechanism which is designated generally by the numeral 23. For the purpose of supporting the boxes or other packages to which the reenforcing band is to be applied, the base 20 is provided with another vertical standard 24 mounted near the outer edge of the base and connected thereto at its lower end. The standard 24 is provided, some distance below its upper extremity, with a laterally projecting flange 25 which is secured to an upwardly extending member 26 formed integrally with the base. The upper portion of the standard 24 is in the form of a hollow cylinder adapted to receive a cylindrical post 27 upon which is mounted the box-supporting table 28. The cylindrical portion of the standard is provided on its outer side with a longitudinal slot 29 adapted to be engaged by a rack bar 30 projecting outwardly from the post 27 to which it is secured. This rack bar is adapted to mesh with a pinion 31 splined on a shaft 32 which is journaled in bearings 33 secured to the standard 24 on the opposite sides of the slot 29. The shaft 32 has a handle 34 mounted thereon to permit the rotation of the pinion 31 for the purpose of raising or lowering the table 28 to accommodate different sizes of boxes or packages placed thereon. The rotation of the shaft 32 and the pinion 31 is normally prevented by clutch members 35 mounted on the end of the shaft 32 and the adjacent bearing 33, as shown in Fig. 5, with their teeth normally engaging each other under the influence of a coil spring 35ª which is mounted between the other bearing 33 and the handle 34 at the other end of the shaft. When the handle is pushed inwardly against the compression of the spring to cause the clutch teeth to disengage, the shaft may be rotated by the handle to raise or lower the post 27. The post is secured in adjusted position by a pair of ears 36 mounted on the upper end of the standard 24 and connected by a bolt 37 having a pivoted handle 38 which may be operated to draw the ears together and thereby clamp the post within the standard.

The box or other package 40, to which the re-enforcing straps are to be applied, is placed on the upper surface of the table 28 with the innermost edge thereof seated against an angle bar 41 which is clamped in position by adjusting devices 42 engaging transverse slots 43 in the table. The slots 43 are formed in the top plate 44 of the table and this plate is also provided with a plurality of circular apertures having spherical balls 45 projecting upwardly therethrough above the top surface of the table to coact directly with the box or package. These balls are mounted in collars 46 which are secured to the lower plate 47 of the table, as shown in Fig. 4. The slots 43 in the upper plate of the table are engaged by the heads 48 of the clamping bolts 49 which extend upwardly through holes in the angle bar 41 with their upper ends threadedly engaged by the hand nuts 50. The angle bar is spaced from the table by lugs 51 on the under side thereof and when the intermediate clamping devices are tightened the bar is secured rigidly in position. The vertical flange of the bar 41 is slotted longitudinally as shown at 52 in Fig. 5 and this slot has a stop member 53 mounted therein and secured in place by the adjusting nut 54 engaging the threaded stem thereon. The box may be readily passed into position against the bar 41 over the ball-bearings 45 and one end wall of the box is adapted to engage the stop member 53 so that the box or package is positioned securely by devices co-acting with the two faces thereof.

When the box or package is positioned on the table 28, it projects over the front edge of the table as shown by dotted lines in Fig. 6 and the re-enforcing strap is applied to the projecting portion of the box or package. The strap 55 is drawn from a reel 56 which is rotatably mounted on a bracket 57 projecting outwardly from the central standard 22. A section of the strap is withdrawn manually from the reel by the operator and coiled around the projecting end of the box, a pair of downwardly projecting inclined arms 58 being secured to the forward corners of the table to prevent the strap from passing beneath the table. The welding and strap-stretching mechanism 23 is carried by a head 60 having the form illustrated particularly in Fig. 11. This head is mounted to rock on a shaft 61 carried by the standard 22 and projecting horizontally therefrom parallel to the table 28. An arm 63 projects rearwardly from the head 60 and the end of the arm is pivotally connected at 64 to a vertical rod 65 which has its lower end pivoted at 66 to the pedal 67. The pedal 67 is pivoted at 68 on the under side of the base 20 and the end of the pedal carries a foot-plate 67ª which is located at the front side of the machine as shown in Fig. 1. The pedal 67 has an arm 69 projecting upwardly therefrom within the hollow base 20, as shown in Fig. 2, and the upper end of this arm is forked to extend on opposite sides of a rod 70 which is secured in the opposite walls of the base. The pedal 67 is normally held in its uppermost position, corresponding to the lowermost position of the rod 65, due to the action of a coil spring 71 which is mounted on the rod 70 between one wall of the base and the collar 71ª which is slidably mounted on the rod. The movement of the arm 69 under the influence of the spring 70 is limited by another spring 72, somewhat shorter and stiffer in construction, which is mounted on the rods 70 at the other side of the arm 69 so that when the lever is elevated and the head 60 thereby tilted upwardly, the tilting of the head is limited by the engagement of the extremity of the arm 69 with the collar 72ª mounted on the rods 70 at the end of the spring 72. By pressing on the pedal 67, the operator is enabled to tilt the head 60 and thus bring the welding plate 75 and the strap-holding plates 76 and 77 into contact with the upper surface of the box 40.

The plates 75, 76 and 77 are carried by the head 60 and are adapted to receive the strap 55 on their upper sides as shown particularly in Fig. 10. The operator maintains his foot on the pedal 67 in order to keep the head 60 in its lower position while the strap 55 is being adjusted with the end thereof overlying the welding plate 75 and with the supply portion 55$^a$, leading from the reel 56, extended over a flange 79 which projects outwardly above the holding plate 76. The free end portion of the strap 55 is adapted to be secured to the plate 76 by a gripping member 80 adapted to engage the upper side of the strap and press it downwardly against the plate. As shown particularly in Figs. 9 and 11, the gripping member 80 extends upwardly into a housing 81 having a detachable front cover plate 82. The bar 80 slides in an inclined guideway and it is normally held in its upward position by means of a spring 83 which engages a slot 83$^a$ therein and is mounted on stationary pins 84. The lower end of the gripping member 80 is serrated to grip the strap 55 while the upper end of the gripping member is provided with a rounded surface adapted to be engaged by a cam 85 which is pivoted at 86 and provided with an operating handle 87. When the handle 87 is turned downwardly to the position illustrated in Fig. 10, the cam forces the member 80 downwardly into engagement with the strap. The forward tilting of the arm 87 is limited by a lug 88 formed on the cam and adapted to engage the shoulder 90. In a similar manner, the portion of the strap 55 at the other side of the welding plate 75 is held against the plate 77 by another gripping member 91 which is mounted in a housing 92 and adapted to slide in an inclined guideway. As in the construction of the other gripping member, the bar 91 is normally forced in an upward direction by means of a spring and the downward movement thereof is effected by means of a pivoted cam 93 having an operating handle 94 which is capable of being moved from the dotted position illustrated in Fig. 9 to the position illustrated by full lines where it holds the gripping member 90 in contact with the upper surface of the strap 55 above the holding plate 77.

The holding plates 76 and 77 and their cooperating gripping members are carried by blocks 95 and 96, respectively, which are threadedly engaged by a screw 97 having right and left-hand threads which engage the two blocks so that upon rotation of the screw the blocks are drawn together or separated, depending upon the direction of rotation. The screw 97 is journaled in bearings 98 carried by the head 60 and the blocks 95 and 96 are provided with projecting arms 100 adapted to slide on rod 101 so that the blocks are prevented from rotating during the rotation of the adjusting screw. The rotation of the screw 97 for adjusting the positions of the blocks 95 and 96 is effected by means of a pinion 102 secured to the screw adjacent one of the bearings 98 and arranged to mesh with a large driving gear 103 mounted on a shaft 104. This gear normally tends to turn in a direction adapted to separate the blocks 95 and 96 due to the action of a flat spiral spring 105 which is secured to the hub of the gear 103 and to the block 106 extending upwardly from the bearing 107 in which the shaft 104 is mounted as shown particularly in Fig. 14. This spring is mounted in a recess 118 which is formed in the side of the gear and is at all times under sufficient tension to return the gear to its normal position after it has been moved in the forward direction for the purpose of moving the blocks 95 and 96 together. This forward motion of the gear 103 is brought about by a lever 110 which is loosely mounted on an extension 111 of the shaft 104. This lever 110 is provided with a hub or drum 112 having a spiral spring 113 fixed and wound thereon with its free end attached at 114 to the arm 115 projecting from a bolt or pin 116 which is carried by a bracket secured to the head 60. This spring 113 tends normally to return the lever 110 to the normal position illustrated in Fig. 8 where the upper part of the lever is shown resting on a rubber bumper 117 mounted on the pin 118 projecting from the side of the bracket 128. When the operator wishes to cause the blocks 95 and 96 to move toward each other to stretch the strap 55 on the box, he grips the handle 110$^a$ of the lever 110 and moves it in a forward direction on its pivot in opposition to the action of the spiral spring 113 which is wound up by the forward movement of the lever. The motion of the lever is imparted to the gear 103 by a pawl 120 which is fixed on a small shaft 121 rotatably engaging the lever and having a cotter pin 122 passing through the opposite end thereof. A coil spring 123 is connected at one end to the cotter pin and at the other end to the upwardly inclined portion 110$^b$ of the lever so that this spring normally tends to move the pawl 120 into engagement with the teeth of the gear 103. When the lever 110 is in its rearward position in contact with the bumper 117, the pawl 120 is held out of engagement with the teeth of the gear by the engagement of a projecting tooth 124 on the pawl with a stationary lug 125 carried by the bracket 128 secured to the head 60. When the operator moves the lever 110 in a forward direction to effect the rotation of the gear 103, the pawl 120 is automatically held in engagement with the gear teeth by the spring 123. As the gear rotates, the teeth thereof are adapted to slide beneath the tooth 126$^a$ of a detent 126 which is pivoted at 127 on the bracket 128 on which the lug 125 is mounted, as shown particularly in Fig. 14. The tooth 126ª of the detent has an inclined rear face so that it permits the forward rotation of the gear while preventing the reverse rotation thereof, and it is normally forced into engagement with the gear teeth by means of a spring 129. When the operator releases the lever 110, it is automatically returned to its normal rearward position by the action of a spiral spring 113, the rear face of the tooth of the pawl 120 being inclined to permit it to slide over the gear teeth during the reverse movement of the lever. When the lever reaches its rearward position, the pawl is automatically moved out of engagement with the gear teeth by the engagement of the projection 124 with the lug 125 and at the same time the lever engages the upwardly extending arm of the detent 126 and moves it out of engagement with the gear teeth so that the gear is then permitted to rotate in the reverse direction under the influence of the coil spring 105, as hereafter explained, thereby effecting an automatic separation of the blocks 95 and 96.

Assuming that the strap 55 has previously been secured in position with the parts thereof above the box or package secured to the holding plates 76 and 77 by the gripping members 80 and 91, respectively, the forward motion of the lever 110 and the corresponding forward rotation of the gear 103 causes the strap to be tightly stretched on the box due to the inward movement of the blocks 95 and 96. The lever may be given a reciprocating motion in order to secure a degree of rotation of the gear 103 necessary to obtain the desired adjustment of the strap and the operator then cuts off the portion of the strap leading from the reel 56 by actuating a cutting blade 135, of substantially semi-circular cross-section, which is carried by a plunger 136 slidably mounted in a guideway 137 formed in the forward part of the head 60. The cutting blade 135 is secured to the plunger 136 by a set-screw 138 which passes through the wall of the socket in which the end of the cutting blade is mounted. This set-screw may be reached through a slot 139 which is formed in the cover-plate 140 mounted on the front end of the head 60 to close the guideway 137. A pin 141 projects laterally from the plunger 136 through a slot 142 located behind the cover-plate 140 and a coil spring 143 connects this pin with a lug 144 projecting laterally from the forward end of the head 60, so that the spring tends normally to move the plunger 136 in an upward direction. The upper end of the plunger 136 carries a roller 145 which is adapted to coact with the cam arm 146 which is operated by a handle 147. The handle and the cam arm are formed integrally and mounted on a shaft which is journaled in the bearing 148 located at the forward end of the head 60, the shaft being provided with a collar 149 at the opposite end thereof, as shown particularly in Fig. 10. When the handle 147 is moved in a forward direction the cam arm, contacting with the roller 145, pushes the plunger 136 downwardly and causes the cutting blade 135 to engage the strap 55 and sever the same by cooperation with a stationary cutting blade 150 which is mounted above the welding plate 75 in a position to receive the lower stretch of the strap beneath it and to support the upper stretch of the strap on its upper surface. The blade 135 is adapted to come to rest before it engages the lower stretch of a strap which lies in contact with the plate 75 so that only the upper stretch of the strap is cut off, this limit of the cutting movement being determined by a lug 151 which is carried by the handle 147 and which engages a stationary lug 152 carried by the bearing 148, as shown in Figs. 7 and 10. When the strap has been cut, the operator releases the handle and both the handle and the plunger are then returned to their normal positions by the action of the coil spring 143, the upper movement of the plunger being limited by the engagement of a lug 151 with another stationary lug 153 which is carried by the bearing 148. After the strap 55 has been severed by the blade 135 and the stationary plate 150, the supply portion 55ª of the strap leading from the reel 56 is held in readiness for the next succeeding operation by a leaf spring 154 which is secured to the head 95 by means of a screw 155 and which forces the strap outwardly against the plate 156 which is secured to the flange 79 projecting outwardly from the head 95 above the holding plate 76. The operation of cutting the strap by the movement of the blade 135 is performed while the strap is stretched tightly on the box or package and after the lever 110 has been released by the operator. The automatic separation of the blocks 95 and 96, which carry the holding plates, is prevented until the gripping members are released from the strap, due to the fact that the tightly stretched strap creates a binding action or frictional engagement of the blocks 95 and 96 with the screw 97. When the gripping members 80 and 91 are released, after the strap has been cut by the cooperating blades 135 and 150, the blocks 95 and 96 are separated by the reverse rotation of the gear 103 caused by the action of the spring 105, as heretofore mentioned.

The lower welding plate 75 is formed on the forward end of a terminal plate 160 which is secured to a laminated copper strap 161 forming the secondary circuit of an electric transformer 162. This transformer is mounted on the head 60, at the rear of the shaft 61 on which the head is adapted to tilt, and the primary windings 163 of the transformer are energized through electric connections 164 leading from a suitable source of supply. The other end of the laminated copper strap 161 which forms the secondary circuit of the transformer is clamped between plates 166 carried by a block 167 of copper or the like, provided at its forward end with a head 168 which carries the movable welding point. The block 167 is mounted to swing laterally on a shaft 169 which is mounted in a vertical plane in bearings formed in a bracket 170 which is mounted at its lower end on a horizontal stub shaft 171 projecting laterally from the head 60 parallel to the shaft 61. The parts of the member 167 which engage the shaft 169 are insulated from the shaft and from the bracket 170 by bushings 172 so that the bracket 170 is not included in the circuit with the block 167 and the welding head 168. This method of mounting the block 167 permits the welding head to be moved both laterally and vertically to effect the desired positioning of the movable welding point. This movable welding point is in the form of a tapered copper plug 175 which fits a similarly shaped recess formed in the lateral projection 176 carried at the lower end of the head 168, as shown particularly in Fig. 15. The head 168 may be moved by rocking the block 167 about the shaft 169 so that it may occupy either of the positions illustrated by full lines and dotted lines in Fig. 15 and, after being placed in either of these positions, the downward movement of the block 167 about the shaft 171 will cause the welding point 175 to compress the overlapping ends of the strap 55 against either of the lower welding points 177 and 178 carried by the lower welding plate 75. The welding points 177 and 178 are also in the form of tapered plugs which detachably engage tapered sockets in the welding plate so that they may be removed and re-placed when desired. This form of construction is of great advantage in permitting the renewal of any of the welding points without the delay and expense of renewing any other parts of the machine. After the head 168 has been lowered in either of the positions illustrated in Fig. 15, the closing of the circuit of the primary winding of the transformer will cause a heavy current to pass instantaneously through the secondary winding of the transformer and through the welding points, resulting in the formation of spot-welds 180 as shown in Figs. 16 and 17. These welds are substantially circular in cross section and are located midway between the lateral edges of the strap in close proximity to the extremities of the strap. The cutting blade 135 being semi-circular in cross section, produces a semi-circular edge on the end of the strap which is concentric with and in close proximity to the adjacent weld 180 so that the bending up of the extreme ends of the strap is prevented during the movement of the box or package after the reenforcing straps have been applied.

The block 167 is guided in its double tilting movement by means of a plate 182 secured to the forward end of the head 60 and having an irregular slot 183 formed therein to be engaged by a pin 184 attached to the block 167 by a bracket 185, as shown in Fig. 15. The motion of the block 167 and of the head 168, within the limits determined by the irregular slot 183, is produced by means of a lever 190 having a handle 191 adapted to be engaged by the hand of the operator. The lever 190 is pivoted at 192 on the block 167 and it is guided by a plate 193 which is spaced outwardly from the block 167 by bushings 194 and secured to the block by bolts 195. The lever 190 normally tends to move in an upward direction with respect to the lock 167 due to the action of a coil spring 196 which has one end connected to the arm 197 projecting downwardly from the lower part of the lever while the other end thereof is connected to a bolt 198, passing through a lug 197 on the side of the block and threadedly engaged on the other side of the lug by an adjusting nut 200. The adjustment of this nut regulates the tension of the spring and varies the pressure of contact of the welding points, as hereinafter more fully explained. Another coil spring 201 is connected between the upward part of the lever 190 and a stationary object, such as the frame of the transformer, and this spring tends normally to maintain both the lever 190 and the block 167 in their uppermost positions. The tension of the spring 196 should be adjusted so that the initial downward pressure on the lever 190 will move the block 167 downwardly about its pivot 171 until the movable welding point engages the upper side of the strap to be welded, as shown in Fig. 15, after which a continued pressure on the lever 190 elongates the spring 196 until the lever reaches a position where it closes a switch and establishes a circuit through the primary winding of the transformer so that a welding current is passed between the welding points while they are in engagement with the strap. The switch mechanism is operated by an arm 202 which projects laterally from the lever 190 and as a stud 203 moves in the outer end thereof. This stud is provided with a winged nut 204 and the lower end thereof is engaged by washers and a nut 205 so that the portion of the stud projecting through the arm 202 may be regulated in length as desired. The end of this stud is adapted to coact with a switch lever 206 which is pivoted on a stub shaft 207 projecting laterally from a bracket attached to the head 60. The switch lever 206 operates a relatively fixed arm 208 which is connected by a coil spring 209 with the upwardly projecting flange 210 formed on the switch arm 211, The switch arm 211 is also pivotally mounted on the stub shaft 207 and the lower end thereof is engaged by a pin 212 which supports a cross bar 213, this bar being insulated from the pin and the adjacent face of the switch arm by means of a bushing 214 and washers 214ª. The ends of the cross bar are constructed in the form of split collars or hubs 215 which are internally threaded to be engaged by the upwardly extending threaded contact members 216, provided at their lower ends with grooves 217 to be engaged by a screwdriver. Each of the hubs or collars 215 is provided with a pair of projecting ears 218 which are united by clamping screws 219 so that the ears may be adjusted to cause the collars to grip the contact members 216 and maintain them in their adjusted positions. When the outer end of the switch arm 211 is elevated, the contact screws 216 are adapted to engage other similar contact screws 220 which are mounted in the terminals 221 connected to the conductors 164 which control the circuit of the primary winding of the transformer. These terminals are mounted in an insulating block 222 which is carried by the upper part of the head 60. The upper contact screws 220 engage split collars or hubs 223, similar to the collars 215 previously described, the collars 223 being also provided with ears 224 which may be brought together by adjusting screws 225. When the stud 203 carried by the lever 190 is brought into engagement with the end of the switch lever 206, the tension exerted on the coil spring 209 raises the switch arm 211 and closes the circuit of the transformer. After the switch is closed, the continued movement of the lever 190, with a resulting extension of the spring 209 takes place to insure a complete closure of the switch contacts, before the motion of the lever 190 is arrested by the engagement of another stud 230 with the upper face of the plate 182 previously described. The stud 230 engages an arm 231 which projects laterally from the lever 190, the upper end of the stud being provided with a winged nut 232 and the lower end thereof being engaged by washers 233 and a nut 234 so that the projecting portion of the stud may be regulated to limit the movement of the lever 190 at any desired point within a considerable range.

The excessive heating of the movable welding head 168 is prevented by a cooling system comprising a tank 240 mounted on a pedestal 241 carried by the upper end of the standard 22. Flexible tubes 242 and 243 lead from the tank 240 at different elevations and are connected to the welding head which is hollow so that the water supplied from the tank 230 is caused to circulate due to the heating thereof by the welding head 168.

In the operation of the machine, the box or package 40 is placed on the table 28 and the post 27 is adjusted vertically in the standard 24 until the top surface of the box is in such proximity to the welding apparatus 23 as to permit the welding plate 75 and the holding plates 76 and 77 to engage the upper side of the box when the head is tilted forwardly and downwardly. The box or package should preferably project beyond the front edge of the table and it may be positioned accurately by adjusting the angle bar 41 and the lug 53 to engage the side and end of the box, respectively, when it is in the desired position. After the box has been located in this manner, the operator seizes the end 55ª of the strap, which is then held on the flange 79 of the block 95 by the action of the spring 154, and after removing the strap from the flange 79, a loop is formed in the strap and it is passed around the projecting end of the box as illustrated particularly in Figs. 6 and 10. The free end of the strap is brought over the right-hand side of the box, as viewed in Fig. 10, with the extremity thereof lying above the lower welding points 177 and 178 and this portion of the strap is secured to the holding plate 76 by operating the cam 85 to move the gripping member 80 downwardly and into engagement with the strap. The loop in the strap is then drawn tightly about the box with the portion thereof above the box extending over the other holding plate 77 and above the stationary cutting blade 150. The supply portion of the strap leading from the reel is placed in position on the flange 79 behind the plate 156, against which it is pressed by the spring 154, and the strap is then secured to the holding plate 77 by operating the cam 93 to force the gripping member 91 into engagement with the strap. The operator then moves the lever 110 in a forward direction, reciprocating the lever if necessary, to bring about the desired degree of rotation of the adjusting or stretching screw 97, thus causing the blocks 95 and 96 to move together and stretch the strap tightly about the box. The preliminary adjustment of the strap should preferably be such that the free end will not project much beyond the stationary welding points 177 and 178 after the stretching of the strap has been completed. After stretching the strap, the handle 147 is moved in a forward direction to cause the downward movement of the plunger 136 and a corresponding downward movement of the cutting blade 135 which cuts off the strap along the edge of the stationary cutting blade 150. The downward motion of the cutting blade also forces the newly cut end of the strap into engagement with the free end of the strap which contacts directly with the welding points 177 and 178, so that after the cutting blade has been returned to its normal position by the action of the spring 148, the apparatus is in readiness for the welding operation. The operator then moves the lever 190 in a forward direction, the downward movement thereof causing a downward tilting of the block 167 until the welding head 168 assumes the position indicated by full lines in Fig. 15, being guided to that position by the inclined wall of the slot in the plate 182. The continued motion of the lever 190 then closes the switch which controls the primary circuit of the transformer, with the result that the contacting extremities of the strap are welded between the welding point 175 and the welding point 177. The operator then releases the lever 190 sufficiently to permit the elevation of the welding point 175 from the upper surface of the strap, under the influence of the spring 201, and a lateral pressure is applied to the lever 190 to move the welding head 168 laterally about the pivot 169, to the extent permitted by the slot 183, whereupon the forward motion of the lever 190 again moves the head 168 downwardly until it assumes the position illustrated by dotted lines in Fig. 15 with the welding point 175 located above the welding point 178. The continued motion of the lever 190 then closes the switch and causes a second weld to be formed as shown in Fig. 16. The lever 190 is then released and permitted to return to its normal position by the action of the spring 196 and 201 after which the levers 87 and 94 are operated to release the strap from the gripping members 80 and 91. The box is then slid in a forward direction to cause the welded strap to slide off of the welding plate 75 and the holding plates 76 and 77, there being sufficient tension in the strap to cause the upper part thereof to spring downwardly into close contact with the upper surface of the box after the plates have been withdrawn. The lever 110 will have been released by the operator and will have automatically returned to its normal position after the strap was first stretched on the box so that the lever will have released the detent 126 and the pawl 120 from engagement with the teeth of the gear 103 and, when the box is moved in a forward direction to release the welded strap from the holding plates 76 and 77, the gear 103 automatically rotates in a reverse direction under the influence of the spiral spring 105, thereby separating the blocks 95 and 96 in readiness for a new adjustment of the strap on another box or package or for the application of another reenforcing strap to the same box or package. Although one embodiment of the invention has been shown and described for purposes of illustration, it will be understood that it may be constructed in various other forms without departing from the scope of the appended claims.

We claim:

1. A device for welding a metal strap comprising means for holding a strap in the form of a loop, means for severing said strap from the source of supply with the ends of the loop overlapping and directed in opposite directions, and means operating thereafter for electrically welding the overlapping ends of the strap.

2. A device for welding a metal strap comprising a pair of holding devices for holding a strap in the form of a loop with its ends overlapping and directed in opposite directions, means for adjusting said ends longitudinally to contract said loop, and means movable into operative engagement with said strap after said loop has been contracted for welding the overlapping ends of the strap.

3. A device for welding a metal strap comprising means for holding a strap in looped form, means for severing the strap from the source of supply with the ends thereof overlapping, means for adjusting said holding means to contract said loop, a plurality of welding points on one side of said overlapped portions of said strap, a welding point on the other side of said overlapped portions, means for positioning said last named welding point opposite either of the first named welding points, and means for causing an electric current to pass between the opposed welding points.

4. A device for welding a metal strap comprising means for holding a strap in looped form with its free end extending beneath the body portion thereof, said holding means comprising a pair of holding devices, means for adjusting said holding devices toward each other, means operated independently of said adjusting means for severing the body portion of said strap with the free ends of the looped portion overlapping, and means for welding said overlapping portions of said strap.

5. A device for welding a metal strap comprising means for holding a strap in looped form with its free end extending beneath the body portion thereof, said holding means comprising a pair of holding devices, means for adjusting said holding devices toward each other, means for severing the body portion of said strap with the free ends of the looped portion overlapping and directed in opposite directions, a pair of welding points adapted to engage opposite sides of said overlapping portions of said strap, and means for causing an electric current to pass between said welding points.

6. A device for welding a metal strap comprising a welding plate, means for holding a strap with its ends located above said plate, a welding head having a part adapted to engage the portions of said strap above said plate, an electric circuit having terminals connected to said plate and to said welding head, a switch for controlling the flow of current to said circuit, a single operating member adapted by its initial movement to move said welding head into engagement with said strap and by the continued movement thereof to operate said switch to close said circuit, and means for permitting the lateral swinging of said welding head by the manipulation of said operating member for effecting the welding of said strap at a plurality of points.

7. A device for welding a metal strap comprising means for holding a looped strap with the free end extending beneath the body portion thereof, a pair of relatively movable cutting blades having rounded edges adapted to engage the body portion of said strap to sever it with the end portions of the strap overlapping, a pair of welding points adapted to engage the overlapping portions of said strap, and means for causing a current to pass between said welding points.

8. A device for welding a metal strap, comprising means for gripping and holding a strap at a plurality of separated points with its ends overlapping, a pair of welding points, means for adjusting the relative positions of said welding points to engage opposite sides of said strap, an electric circuit for actuating said welding points, and means for closing said circuit.

9. A device for welding a metal strap, comprising means for holding a strap with its ends overlapping, a pair of stationary welding points adapted to engage one side of the overlapping portions of the strap, a movable welding point, means for moving said movable welding point into contact with said strap opposite each of said stationary welding points in succession, and means for causing an electric current to pass between the opposite welding points when said movable welding point is in each of said positions.

10. A device for welding a metal strap comprising means for holding the strap, a stationary welding plate having a plurality of spaced welding points, a movable welding head having a single welding point and means for moving said welding head laterally and vertically to position its welding point opposite either of said first named welding points.

11. A device for welding a metal strap, comprising means for holding the strap with its ends overlapping, a welding plate adapted to rest on a support beneath the overlapping ends of the strap, a movable welding head having a part adapted to engage said strap on the side thereof opposite said plate, and means for swinging said welding head about vertical and horizontal axes to engage said strap in any one of a plurality of positions above said plate.

12. A device for applying a metal strap to a package, comprising means for holding the strap looped around the package, means for stretching the strap into close contact with the package, means for cutting the strap to form overlapping end portions, a pair of welding points adapted to engage the under side of the overlapping portions of said strap, a movable welding point adapted to engage the upper side of the overlapping portions of said strap opposite each of said first-named welding points, and means for causing an electric current to pass between the opposite welding points.

13. A device for applying a metal strap to a package, comprising means for holding the strap looped around the package, means for stretching the strap into close contact with the package, means for cutting the strap to form overlapping end portions, a pair of welding points adapted to engage the under side of the overlapping portions of said strap, a movable welding point adapted to engage the upper side of the overlapping portions of said strap opposite each of said first-named welding points, means for causing an electric current to pass between the opposite welding points, and means for guiding the movements of said movable welding point.

14. A device for welding a metal strap, comprising a welding plate, means for holding a strap with its ends overlapping above said plate, a movable welding head, a transformer having a secondary winding connected to said welding head and said plate, an electric circuit connected to the primary winding of said transformer, a switch for closing said circuit, and means for moving said welding head into engagement with said strap and for closing said switch thereafter.

15. A device for welding a metal strap, comprising a welding plate, means for holding a strap with its ends overlapping above said plate, a movable welding head, a transformer having a secondary winding connected to said welding head and said plate, an electric circuit connected to the primary winding of said transformer, a switch for closing said circuit, a lever mounted on an axis having a fixed position with respect to said welding head, extensible means for restraining the pivotal movement of said lever with respect to said head, said lever being adapted by its initial movement to move said head into engagement with the upper side of the overlapping portions of said strap, and means actuated by the continued motion of said lever for closing said switch.

16. A device for welding a metal strap, comprising a welding plate, means for holding a strap with its ends overlapping above said plate, a movable welding head, a transformer having a secondary winding connected to said welding head and said plate, an electric circuit connected to the primary winding of said transformer, a switch for closing said circuit, a lever mounted on an axis having a fixed position with respect to said welding head, extensible means for restraining the pivotal movement of said lever with respect to said head, said lever being adapted by its initial movement to move said head into engagement with the upper side of the overlapping portions of said strap.

17. A device for welding a metal strap, comprising a welding plate, means for holding a strap with its ends overlapping above said plate, a movable welding head, a transformer having a secondary winding connected to said welding head and said plate, an electric circuit connected to the primary winding of said transformer, a switch for closing said circuit, a lever mounted on an axis having a fixed position with respect to said welding head, extensible means for restraining the pivotal movement of said lever with respect to said head, said lever being adapted by its initial movement to move said head into engagement with the upper side of the overlapping portions of said strap, and stationary means adapted to limit the continued motion of said first-named lever after said switch is closed.

18. A device for applying a metal strap to a package, comprising a supporting head, a welding plate carried by said head, a member mounted on said head to tilt about a horizontal axis, a block mounted on said member to swing about a vertical axis, a welding head carried by said block opposite said welding plate, and means for swinging said block laterally and vertically.

19. A device for welding a metal strap comprising a supporting frame, a pair of holding devices carried by said frame for holding the strap in the form of a loop with its ends overlapping and directed in opposite directions, means for adjusting said holding devices longitudinally of said strap to contract said loop, welding means carried by said supporting frame to engage said strap between said holding devices after said loop has been contracted, and means for supporting and permitting movement of said frame for effecting bodily movement of said holding devices and said welding means.

20. A device for welding a metal strap comprising a supporting frame, a pair of holding devices carried by said frame for holding the strap in the form of a loop with its ends overlapping and directed in opposite directions, means for adjusting said holding devices longitudinally of said strap to contract said loop, welding means carried by said supporting frame to engage said strap between said holding devices after said loop has been contracted, and a standard on which said supporting frame is pivoted for permitting bodily movement of said holding devices and said welding means to and from operative position.

CHESTER M. MacCHESNEY.
RALPH H. NORTON.